A. L. STEVENS.
WATER COOLED VALVE.
APPLICATION FILED SEPT. 10, 1912.
1,219,501.
Patented Mar. 20, 1917.
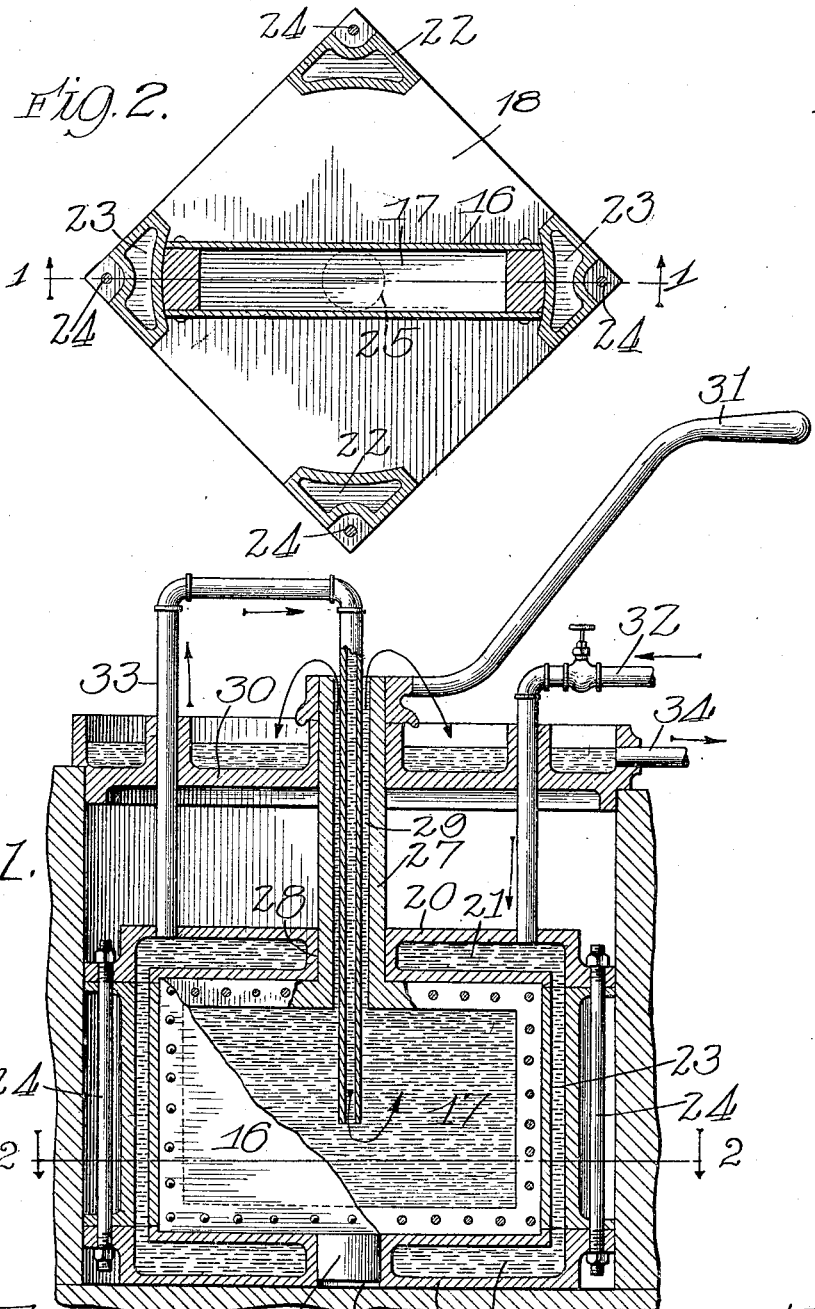

UNITED STATES PATENT OFFICE.

ARTHUR L. STEVENS, OF CHICAGO, ILLINOIS.

WATER-COOLED VALVE.

1,219,501.  Specification of Letters Patent.  Patented Mar. 20, 1917.

Application filed September 10, 1912. Serial No. 719,531.

*To all whom it may concern:*

Be it known that I, ARTHUR L. STEVENS, a citizen of the United States, residing at Chicago, in the county of Cook and State of Illinois, have invented certain new and useful Improvements in Water-Cooled Valves, of which the following is a specification.

My invention relates to valves used for controlling high temperature gases; and the object of the invention is to provide an improved water-cooled valve mechanism in which water is circulated through water spaces provided in the valve, its seats, and the other parts of the mechanism with which the hot gases come into contact so as, in the first place, to keep these parts from burning out or being otherwise injured by exposure to high temperature, and, in the second place, to maintain the valve and the parts with which it engages at substantially equal temperatures so that the proper operation of the valve will not be interfered with because of unequal expansion.

The invention has for a further object to provide a water-cooled valve having the improved features and consisting of the novel combinations, arrangements and devices shown in the drawings hereto annexed and which will be hereinafter more particularly described and claimed.

The invention is illustrated in the accompanying drawings, wherein—

Figure 1 is a vertical sectional view of a valve mechanism, this view being taken on line 2—2 of Fig. 2, and Fig. 2 is a sectional plan taken on line 3—3 of Fig. 1 without, however, showing the brickwork in which the valve casing is located.

Like characters of reference designate like parts in the several figures of the drawing.

Referring to the drawings, the valve consists of a rectangular structure 16 which is hollow so as to provide the water space 17. The valve is rotatably mounted in a casing consisting of the base plate 18 formed with the water space 19, the top plate 20 formed with the water space 21 and the upright structures 22 which provide seats for the valve and are formed with passageways 23 communicating with the water spaces 19 and 21. The base and top plates are secured together, with the seat forming structures intervening, by means of the bolts 24. The valve is provided with a trunnion 25 which enters an opening 26 in the base plate. The valve is also formed with a stem 27 extending through and closely fitting an opening 28 in the top plate 20. The stem is hollow, providing a water outlet passageway 29 communicating with the water space 17 and preferably open at the top so that the water may overflow and be received in a vessel 30 arranged above the valve casing. The stem 27 is provided with the handle 31 by means of which the valve may be turned on its trunnion.

32 designates a supply pipe which leads to the water space 21. 33 designates a U-shaped pipe, one branch of which leads from the water space 21, the other, which is preferably longer, extending down through the hollow stem of the valve into the water space 17. The water is discharged from the receptacle or pan 30 through a pipe 34.

When these preferred arrangements are adopted fresh water enters the space 21 through the pipe 32, passes down into the water space 19 through one or more of the passageways 23 and back again to the water space 21 through the other passageways formed in the space 22, thence rises through the pipe 33, and after circulating through the water space 17 in the valve, rises through the hollow stem of the valve and overflows into the pan 30. The circulation of water, it will be observed, not only keeps both the valve and its casing from burning out or warping or being otherwise injured by exposure to high temperatures, but keeps the valve and the casing at substantially equal temperatures so that, if all the parts are made of the same metal, the expansion is the same. This insures against the valve sticking or leaking which would be likely to occur if the expansion of the valve were substantially greater or less than that of the parts with which it engages. The pan 30 is preferably left open so that one can observe the circulation and properly govern the supply of water.

While I have described my invention in a preferred embodiment it will be readily understood that modifications might be devised without departure from the principles of the invention. Therefore I do not wish to be understood as limiting the invention to the particulars shown and described.

I claim:

1. The combination with a pivoted valve formed with a water space; of a casing for said valve comprising top and base plates each formed with water spaces and one or more pairs of oppositely arranged seats which have passages therethrough communicating directly with the water spaces in the top and base plates; a hollow stem on said valve; means for introducing water to and from the water space in said valve through one end of said stem; and means for circulating water through the casing.

2. The combination with a pivoted valve formed with a water space; of a casing for said valve comprising top and base plates, each formed with water spaces and one or more pairs of oppositely arranged seats which have passages therethrough communicating directly with the water spaces in the top and base plates; a hollow stem on said valve through which water is discharged from the separate water space in the valve; and a water inlet pipe extending through said stem into the water space in said valve.

3. The combination with a pivoted valve formed with a water space; of a casing for said valve comprising top and base plates, each formed with water spaces and one or more pairs of oppositely arranged seats which have passages therethrough communicating directly with the water spaces in the top and base plates; a hollow stem on said valve through which water is discharged from the water space in the valve; a pipe leading from the water space in the casing and extending through the stem into the water space in the valve; and means for introducing water into said casing.

4. The combination with a pivoted valve formed with a water space; of a casing for said valve comprising top and base plates, each formed with water spaces and one or more pairs of oppositely arranged seats which have passages therethrough communicating directly with the water spaces in the top and base plates; a hollow stem on said valve through which water is discharged from the water space in the valve; a pipe leading from the water space in the casing and extending through the stem into the water space in the valve; and a supply pipe leading to said casing.

5. The combination with a pivoted valve formed with a water space; of a casing for said valve comprising top and base plates, each formed with water spaces and one or more pairs of oppositely arranged seats which have passages therethrough communicating directly with the water spaces in the top and base plates; a hollow stem on said valve through which water is discharged from the water space in the valve; a pipe of smaller diameter than the inside diameter of the stem leading from the water space in the casing and extending through the stem into the water space in the valve so as to leave an overflow space in the stem; a supply pipe leading to said casing; and means on said stem for rotating the valve.

6. The combination with a pivoted valve formed with a water space; of a casing for said valve comprising top and base plates, each formed with water spaces and one or more pairs of oppositely arranged seats which have passages therethrough communicating with the water spaces in the top and base plates; a hollow stem on said valve through which water is discharged from the water space in the valve; a pipe leading from the water space in the casing and extending through the stem into the water space in the valve; a supply pipe leading to said casing; and a receptacle above the casing adapted to receive water from the stem.

7. In valve mechanism, the combination with a casing comprising rectangular base and top plates having water spaces and seat forming structures arranged at the corners of the base and top plates provided with passageways communicating with the water spaces in the top and base plates, a valve formed with a water space, having a pivot which bears in an opening in the base plate, and a hollow stem passing through the top plate, a receptacle arranged beneath the upper end of said valve stem, a handle on the stem, a supply pipe leading to the water space in the top plate, and a pipe leading from the water space in the casing through the hollow stem into the water space in the valve.

8. In valve mechanism the combination of a pivoted valve formed with a water space; a casing for said valve comprising top and base plates each formed with water spaces, and a plurality of seats for said valve formed with water spaces which constitute the only means of communication between said top and base plates; a hollow stem on said valve; a water inlet pipe communicating with the casing; and a casing outlet pipe of lesser diameter than said hollow stem, traversing the stem, and terminating within the water space of the valve.

9. In valve mechanism the combination of a pivoted valve formed with a water space; a casing for said valve comprising top and base plates each formed with water spaces, and a plurality of seats for said valve formed with water spaces which constitute the only means of communication between said top and base plates; a hollow stem on said valve; a water inlet pipe communicating with the casing; and a casing outlet pipe of lesser diameter than said hollow stem, traversing the stem, and terminating within the water space of the valve, all of said water spaces and pipes forming a single water conduit.

10. The combination with a valve, of a concave seat for the same which, when the valve is closed, engages the periphery of the valve, a water space formed in the valve, a water space formed in the seat, and means constituting a single conduit connecting said spaces.

11. The combination with a valve having a convex periphery, of a concave seat for the same which, when the valve is closed, engages the periphery of the valve, a water space formed in the valve, a water space formed in the seat, means constituting a single conduit connecting said spaces, a water supply pipe communicating with one of said spaces, and a discharge pipe leading from the other.

12. The combination with a valve having a convex periphery, of a casing for the same providing a concave seat which, in the closed position of the valve, engages the periphery of the valve, a water space in the valve, a water space in the casing, and means constituting a single conduit connecting said spaces.

13. The combination with a valve having a convex periphery, of a concave seat for the same which, in the closed position of the valve, engages the periphery of the valve, the valve and seat being each formed with a water space, and conduits connecting said spaces with a source of water supply and providing discharges therefor.

14. The combination with a pivoted valve which is hollow so as to provide a water space and formed with a convex peripheral surface, of a casing for the same comprising one or more pairs of oppositely arranged seats concave in cross-section and formed with water spaces, said seats in the closed positions of the valve engaging the periphery of the valve, and means constituting conduits whereby water may be circulated in series through said spaces.

15. In a valve mechanism, the combination with a hollow valve casing of a pivoted valve having a water space and a hollow stem open at the top, which communicates with said water space and permits the water to discharge therefrom, in combination with a water pipe of smaller diameter than the inside diameter of the stem, extending from the casing through the open top of said stem and into said water space so as to provide a conduit through which the water in said casing passes to the water space in said valve.

16. In a valve mechanism, the combination with a hollow valve casing of a pivoted valve having a water space and a hollow stem open at the top which communicates with said water space and permits the water to discharge therefrom, in combination with a water pipe of smaller diameter than the inside diameter of the stem, extending through the opening in said stem into said water space so as to provide a conduit through which the water in said space passes to the water space in said valve, and means on the stem for rotating the valve.

17. In a valve mechanism, the combination with a hollow valve casing of a pivoted valve having a water space and a hollow stem open at the top which communicates with said water space and permits the water to discharge therefrom, in combination with a water pipe of smaller diameter than the inside diameter of the stem, extending through the open top of said stem into said water space so as to provide a conduit through which the water in said space passes to the water space in said valve, means on the stem for rotating the valve, and a receptacle which is adapted to receive the water overflowing through said stem.

ARTHUR L. STEVENS.

Witnesses:
L. A. FALKENBERG,
R. C. THORESON.

Copies of this patent may be obtained for five cents each, by addressing the "Commissioner of Patents, Washington, D. C."

It is hereby certified that in Letters Patent No. 1,219,501, granted March 20, 1917, upon the application of Arthur L. Stevens, of Chicago, Illinois, for an improvement in "Water-Cooled Valves," errors appear in the printed specification requiring correction as follows: Page 2, line 20, claim 2, strike out the word "separate;" same page and claim, line 21, before the word "water" insert the word *separate;* and that the said Letters Patent should be read with these corrections therein that the same may conform to the record of the case in the Patent Office.

Signed and sealed this 8th day of October, A. D., 1918.

[SEAL.]

R. F. WHITEHEAD,

*Acting Commissioner of Patents.*

Cl. 137—149.